US008386387B2

(12) United States Patent
Johnson et al.

(10) Patent No.: US 8,386,387 B2
(45) Date of Patent: Feb. 26, 2013

(54) SYSTEM AND METHOD FOR TRACKING SYNDICATION OF INTERNET CONTENT

(75) Inventors: Bradley G. Johnson, Brooklyn, NY (US); Simon A. Assaad, Far Hills, NJ (US); David V. Carson, Westport, CT (US)

(73) Assignee: Utrom Processing Co. L.L.C., Wilmington, DE (US)

( * ) Notice: Subject to any disclaimer, the term of this patent is extended or adjusted under 35 U.S.C. 154(b) by 918 days.

(21) Appl. No.: 11/963,248

(22) Filed: Dec. 21, 2007

(65) Prior Publication Data
US 2009/0164271 A1   Jun. 25, 2009

(51) Int. Cl.
G06F 21/00 (2006.01)
G06F 3/00 (2006.01)
G06F 15/16 (2006.01)
G06F 15/173 (2006.01)
G06F 7/04 (2006.01)

(52) U.S. Cl. .......... 705/51; 715/760; 709/203; 709/219; 709/223; 726/4; 726/9

(58) Field of Classification Search .............. 705/51, 705/58; 715/760; 709/203, 219, 223; 726/4, 726/9
See application file for complete search history.

(56) References Cited

U.S. PATENT DOCUMENTS

| 6,757,661 | B1 | 6/2004 | Blaser et al. | |
|---|---|---|---|---|
| 6,976,010 | B2 * | 12/2005 | Banerjee et al. | 705/51 |
| 7,406,499 | B2 * | 7/2008 | Singh et al. | 709/205 |
| 7,769,827 | B2 | 8/2010 | Girouard et al. | |
| 2002/0138844 | A1 * | 9/2002 | Otenasek et al. | 725/87 |
| 2004/0010467 | A1 * | 1/2004 | Hori et al. | 705/50 |
| 2004/0225612 | A1 * | 11/2004 | Shimojima et al. | 705/57 |
| 2005/0047752 | A1 | 3/2005 | Wood et al. | |
| 2005/0144136 | A1 * | 6/2005 | Murashita | 705/51 |
| 2006/0095507 | A1 * | 5/2006 | Watson | 709/203 |
| 2006/0168510 | A1 * | 7/2006 | Bryar et al. | 715/511 |
| 2006/0173985 | A1 * | 8/2006 | Moore | 709/223 |
| 2007/0038567 | A1 * | 2/2007 | Allaire et al. | 705/50 |
| 2007/0180523 | A1 * | 8/2007 | Jablonski et al. | 726/22 |
| 2007/0214498 | A1 * | 9/2007 | Pindra et al. | 726/4 |

(Continued)

FOREIGN PATENT DOCUMENTS
WO    WO 0217205 A2 *  2/2002

OTHER PUBLICATIONS

U.S. Appl. No. 11/750,665, filed May 18, 2007, Carson et al.

(Continued)

Primary Examiner — Fadey Jabr
(74) Attorney, Agent, or Firm — Woodcock Washburn LLP (57) ABSTRACT

A method and system for syndicating content via a plurality of publication venues is provided. In one embodiment the method includes storing in a memory a plurality of videos; storing a content identifier (ID) for each of the plurality of videos; storing a syndication ID for each of the plurality of publication venues, wherein at least some of the plurality of publications venues act as a referring venue for other publication venues; and storing information sufficient to identify the referring venue for the other publication venues. The method may further comprise receiving a syndication request for a first video from a requester, wherein the request includes a first content ID for the first video and a first syndication ID; generating code that includes the first content ID and a second syndication ID; associating the first content ID, the first syndication ID and the second syndication ID in a memory; and providing the code to the requester.

27 Claims, 4 Drawing Sheets

U.S. PATENT DOCUMENTS

| | | | |
|---|---|---|---|
| 2007/0219910 A1* | 9/2007 | Martinez | 705/51 |
| 2007/0240039 A1* | 10/2007 | Hosotsubo | 715/517 |
| 2007/0250467 A1* | 10/2007 | Mesnik et al. | 707/1 |
| 2007/0282819 A1 | 12/2007 | Lynn et al. | |
| 2007/0288950 A1 | 12/2007 | Downey et al. | |
| 2007/0299935 A1* | 12/2007 | Plastina et al. | 709/219 |
| 2008/0010112 A1* | 1/2008 | Kniaz et al. | 705/14 |
| 2008/0027931 A1* | 1/2008 | Lu et al. | 707/6 |
| 2008/0066172 A1* | 3/2008 | Tarsi | 726/9 |
| 2008/0092189 A1* | 4/2008 | Baker et al. | 725/112 |
| 2008/0097830 A1* | 4/2008 | Kim | 705/10 |
| 2008/0120156 A1* | 5/2008 | Nusbaum | 705/7 |
| 2008/0120668 A1 | 5/2008 | Yau | |
| 2008/0126364 A1* | 5/2008 | Khosravy et al. | 707/100 |
| 2008/0134249 A1 | 6/2008 | Yang et al. | |
| 2008/0148322 A1 | 6/2008 | Howcroft | |
| 2008/0215675 A1* | 9/2008 | Kaminitz et al. | 709/203 |
| 2008/0263602 A1* | 10/2008 | Murray et al. | 725/87 |
| 2008/0271080 A1 | 10/2008 | Gossweiler et al. | |
| 2008/0294647 A1* | 11/2008 | Ramaswamy | 707/10 |
| 2010/0146077 A1* | 6/2010 | Davies et al. | 709/219 |
| 2010/0274815 A1* | 10/2010 | Vanasco | 707/798 |
| 2011/0093926 A1* | 4/2011 | Martin et al. | 726/4 |
| 2011/0314368 A1* | 12/2011 | Chevalier | 715/234 |

OTHER PUBLICATIONS

U.S. Appl. No. 12/026,390, filed Feb. 5, 2008, Johnson et al.
U.S. Appl. No. 12/465,907, filed May 14, 2009, Penberthy et al.
U.S. Appl. No. 13/094,011, filed Apr. 26, 2011, Johnson et al.

\* cited by examiner

SYSTEM AND METHOD FOR TRACKING SYNDICATION OF INTERNET CONTENT

FIELD OF THE INVENTION

The present invention generally relates to systems and methods for tracking internet content, and more particularly to systems and methods for tracking the syndication of internet content.

BACKGROUND OF THE INVENTION

While the Internet has become a widespread means of communicating data, it has recently become a principal means of communicating video data around the world. Most web pages include text, graphics, and other non-video data. However, as broadband has become more ubiquitous, more and more end users are receiving and transmitting video over the Internet. Video files and some audio files tend to be larger than other types of files. The availability of broadband allows users to transmit and receive larger files in acceptable time frames. This fact, at least in part, has led to the increase in the amount of video and audio data communicated over the Internet.

Some web sites that host (store) videos and other content allow users to post video and other types of content for other users to view. In addition, some such web sites allow third party web sites to embed code associated with a video (or other content) on their web sites to allow visitors to such third party web sites to view the video. In other words, an operator of the host server allows third party web sites to embed code in the web pages (of the third party web site) that include a link pointing to video content on the host server. Users who visit the third party web site and click on the link receive the video from the host server or, alternately, the video is loaded when the web pages loads. Thus, the user viewing a given web site may receive web pages from the third party web site's server while also receiving video content from a video host server. Thus, the video (or other content) is syndicated via third party web sites.

Subsequently, a second user who visits the third party web site also may want to publish the video (or other content) on their own web site (and thereby become a syndicator of the video). To do so, the second user would also receive embedded code from the host server to embed in their website—or alternately, may be provided a copy of the embedded code from the third party web site. Typically, the embedded code for each third party web site will be substantially the same (or identical) and simply include a unique content identifier (content ID). The content ID is transmitted from the client (i.e., the user's browser) in a content request to the host server and allows the host server to identify the content to be transmitted to the client.

Currently, there is no means to allow the host server to track the syndication of content across the internet. In other words, there is no means to allow a host server to monitor the proliferation of the embedded code (that is used to publish the content on third party web sites) from one third party web site to other third party web sites and further, to monitor the content views for which a syndicating web site is responsible (i.e., the number of content views of a syndicating web site and of all the third party web sites that have become syndicated via that syndicating web site). Such information will become more valuable as video and video advertisements (advertisements that are presented along with video content—either before, after, during, and/or physically near the video) become more and more ubiquitous. Tracking the syndication of content and other advantages are provided by one or more embodiments of the present invention.

SUMMARY OF THE INVENTION

The present invention provides method and system for syndicating content via a plurality of publication venues. In one embodiment the method includes storing in a memory a plurality of videos; storing a content identifier (ID) for each of the plurality of videos; storing a syndication ID for each of the plurality of publication venues, wherein at least some of the plurality of publications venues act as a referring venue for other publication venues; and storing information sufficient to identify the referring venue for the other publication venues. The method may further comprise receiving a syndication request for a first video from a requester, wherein the request includes a first content ID for the first video and a first syndication ID; generating code that includes the first content ID and a second syndication ID; associating the first content ID, the first syndication ID and the second syndication ID in a memory; and providing the code to the requester.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, publication venue, report, web site, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, content delivery services, communication systems, computers, publication venue, report, web site, terminals, devices, components, techniques, data and network protocols, software products and systems, operating systems, development interfaces, and hardware are omitted so as not to obscure the description of the present invention.

A web site, unless otherwise denoted, is meant herein to refer to one or more web pages (e.g., that share one or more domain names), blogs, ftp lists, directories, and/or other internet form. As used herein, "content" refers to a work which is accessed for presentation by users from web sites. The work may be one or more videos (with or without audio), photographs, graphical images, animations, audio files, textual works, and/or any combination of the same. According to an example embodiment of the present invention, syndicated content comprises content that may be stored on one or more host servers and that is distributed to clients (e.g., browsers) that request such content via web pages served from third party web pages. Finally, "publication venue," as used herein, is meant to refer to a website or other media (e.g., an email) that provides data files (e.g., web pages) from which a user can request (e.g., via a client) content. As an example, third party websites may serve web pages that include a link to a video.

Figure 1:
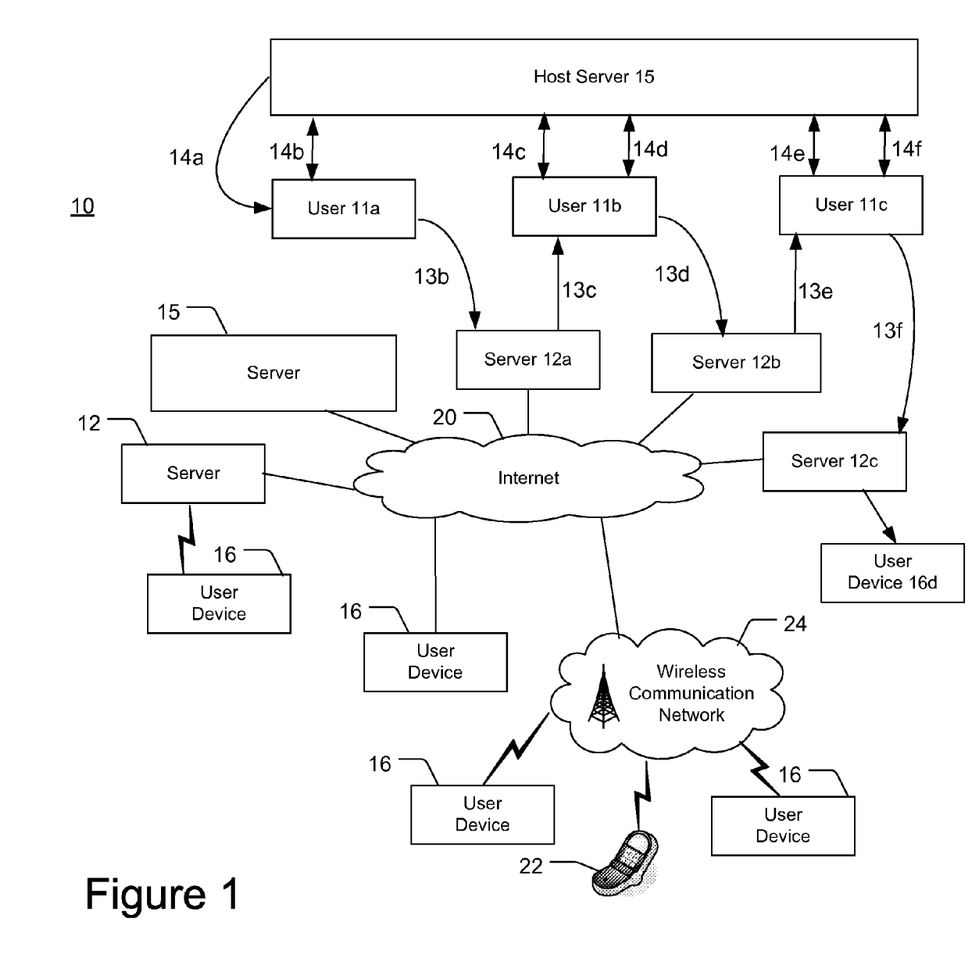
FIG. 1 is a block diagram of an example network environment for tracking syndication of internet content.

FIG. 1 shows a global network environment 10 for hosting a system and method for tracking syndication of internet content according to an example embodiment of the present invention. The network environment 10 may include multiple servers 12, including host server(s), content delivery networks, web services 15, and user devices 16 which may connect to and form part of the internet 20. In some embodiments user devices 16, such as a mobile communication device 22 (e.g., a mobile telephone), may be coupled to (or form part of) a wireless communication network 24, which in turn may be coupled to the internet 20. Exemplary user devices 16 may include a computer, Voice-over IP endpoint, game system, personal digital assistant (PDA), mobile telephone, digital cable box, stereo system, television, or other user device having a data interface. Depending on the form of the internet files communicated by such devices, the user devices 16 typically will include a browser (referred to herein as a client) which is a software application that executes on the user device 16.

A server 12, 15 may include one or more computers that may (or may not) be co-located with each other including a controller (formed of one or more central processing units (CPUs)) and memory. The server also includes appropriate software as is known in the art. In this embodiment, the servers comprise web servers configured to serve web pages (e.g., HTML files) and syndicated content. Other types of servers also may be used within the scope of the present invention. Host server 15 (as used herein) refers to a server that stores or otherwise controls the distribution of the syndicated content and may also store and distribute other content (i.e., non-syndicated content).

The content may be stored on the host server via any suitable means. For example, a person or entity controlling specific content may store the content on the host server 15 directly, such as via a user input device or through the internet such as via an upload process from a user device 16 and/or another server 12. Content may be provided by the operator or may be provided by members of the public who may be invited to upload content.

In one example embodiment, illustrated in FIG. 1, host server 15 stores videos and other content, some of which is received from the general public, some of which is installed by third party owners of the content, and some of which is installed by the operator of the server 15. In addition, the host server 15 allows third party web sites to syndicate the content (i.e., publish the content from the third party web site by providing a hyperlink in a web page that points to the video (or other content) on the host server 15) so that the content becomes embedded in the third party web site. To do so, the host server provides a syndicator (the operator of the third party web site) software code to be embedded in (i.e., included in) one or more web pages of the syndicator's (the third party) web site.

FIG. 1 illustrates an example of how such syndication may occur. A first user 11a receives and views a video (in a client) via communication 14a and decides that he or she would like to publish the video on their own web site. Via communications 14b, the user 11a requests for, and receives, embedded code that points to the video content on the host server 15. The user 11a then includes that embedded code on a web page of his or her own web site (which in this example is a blog hosted on server 12a) via communication 13b.

A second user 11b viewing the first user's 11a blog received from server 12a, clicks on a link that transmits a request to the host server 15, which responds by transmitting the video to the client (communication 14c), which presents the video to user 11b. User 11b decides to publish this same video on her web site. To do so, she requests and receives the embedded code via communications 14d (e.g., requests the embedded code by clicking on a link in the web page received from host server 12a). User 11b then includes that embedded code on a web page of her own web site (which in this example is a web site hosted on server 12b) via communication 13d. Similarly user 11c may receive a web page from server 12b (communication 13e), request and receive the video (communications 14e), request and receive embedded code (communication 14f), and store the web page with the embedded code on the server 12c hosting their own web site (communication 13f) to thereby publish the video on their own web site. Communications between the users 11 and the host server 15 will typically traverse the internet but are shown schematically in FIG. 1 as direct communications for ease of explanation.

As is evident from this example, the operator of the host server 15 allows third party web sites to embed code in the web pages (of the third party web site) that include a link pointing to video content on the host server 15. Users who visit the third party web site and click on the link receive the video from the host server 15. As will be evident to those skilled in the art, the video content may be requested and provided by any suitable means such as, for example, requested automatically by code in the web page when the web page is loaded so that the video begins playing automatically soon after (or simultaneously with) the loading of the web page. In either case, the user viewing a given web site may receive web pages from the third party web site's server 12 while also receiving video content from a video host server 15. While syndication of the video may originate from the host server, it may be syndicated "through" a plurality of intermediate web sites before being published by a given web site.

In the past, the embedded code for each third party web site typically will be substantially the same (or identical) and simply include a unique content identifier (the content ID). The content ID is transmitted from the client (i.e., the user's browser) in a content request to the host server 15 and allows the host server 15 to identify the content to be transmitted to the client. In an example embodiment of the present invention, the system uses additional information in the embedded code to allow the host server 15 to track the syndication of the content across multiple syndicating web sites.

Figure 2:
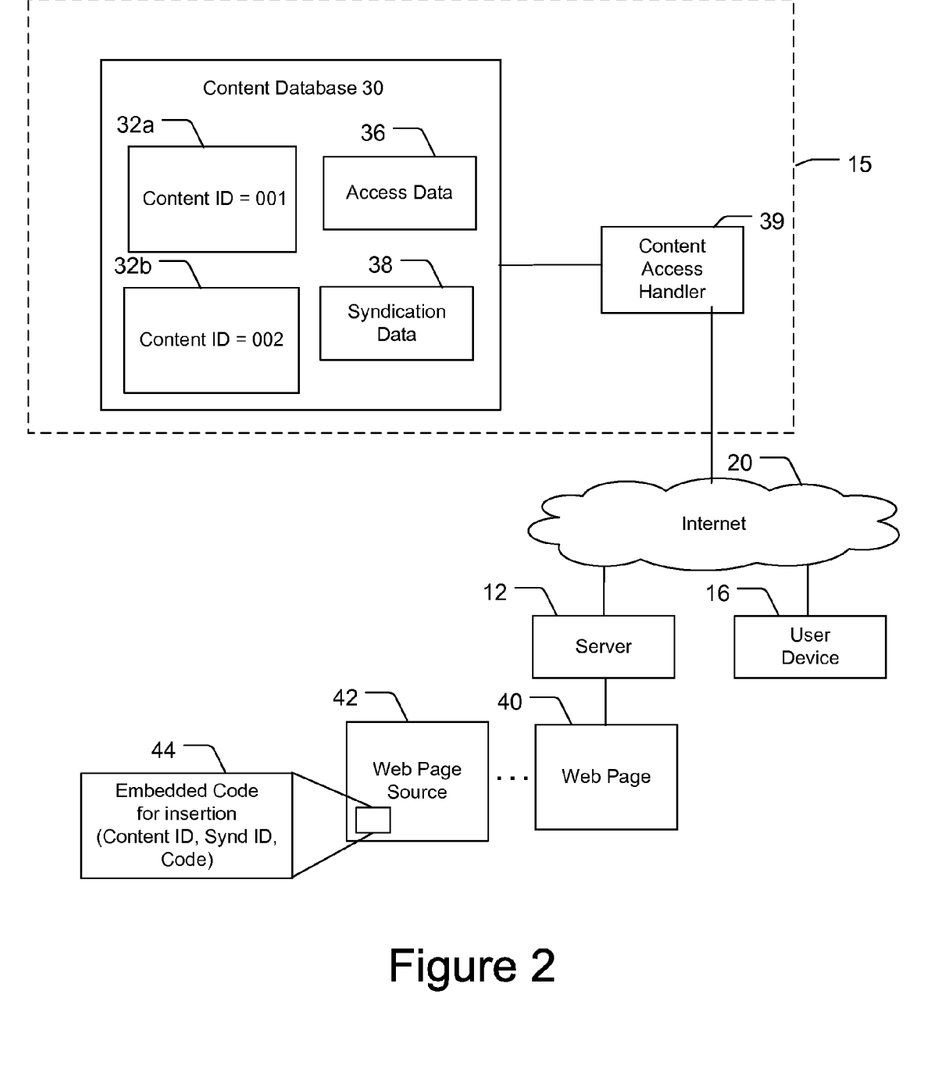
FIG. 2 is a data and control flow diagram of a system for syndicating internet content according to an example embodiment of the present invention.

FIG. 2 shows data and control flow for managing syndicated content according to an example embodiment of the present invention. It is worth noting that that the components illustrated by FIG. 2 and elsewhere are functional components employed herein for ease and clarity of discussion of the processes of one or more example embodiments of the present invention. The different components, in many implementations, may be performed by the same hardware and/or common software modules. In addition, other embodiments may have additional and/or different functional components for performing additional and/or different processes for implementing the present invention.

The location of syndicated content may be stored in memory in a content database 30 forming part of (or accessible by) the host server 15. The database 30 may include server locations of various files, records or other units of content including, in this example, video files. For brevity of discussion, video refers to video content (which may or may not have audio) comprised of one or more video files. In this example, each content item has an associated content ID code (i.e., a content ID). For example, video 32*a* has a content ID of 001. A second video 32*b* has a content ID of 002. Although both examples above are recited as being video, the syndicated content may take other forms also, as described above.

In some embodiments the content database 30 or other memory may store records of access (access data 36) and records of syndication (syndication data 38). The access data 36 of this example may include records storing data of the number of times a given content item is transmitted to clients (e.g., browsers) referred to herein as content views. For example, when a user browses to a web page that serves as a publication venue for syndicated content (and in some instances, clicks on a link to present the syndicated content) the content is transmitted from the host server 15 to the user device 16 for presentation. A corresponding entry is made to record the content view in the access data 36. Such entry may include the content ID and a time and date stamp. In addition, the number of content views of that content item may be tallied. In other embodiments, the record also may include additional data, (e.g., such as a destination address of the device requesting the content, a syndication ID, etc.).

A syndication ID may be used to track the syndication of content from web site to web site across the internet. In one example, a unique syndication ID is provided for each publication venue (e.g., web site) for a given content item. For example, syndicated content 32*a* having a content ID of 001 may be published via a link at each of three publication venues. The embedded code provided to each of the three websites may include the same content ID (001) and a different syndication ID, (e.g., 00*a*; 00*b*; and 00*c*). Similarly, syndicated content 32*b* having a content ID of 002 may be published at four web sites. In an example where content 32*b* has a content ID of 002 and four publication venues, the four web sites may be provided embedded code having syndication IDs 00*a*, 00*b*, 00*c* and 00*d*, respectively.

After the embedded code (with the content ID and syndication ID) is embedded on a web page, users may click on a link to view the content, which causes the client to transmit a request to the host server 15 for the video. The host server 15 receives the request which includes the content ID and the syndication ID, and stores information of the request (e.g., content ID, the syndication ID, date, time, IP address of client, etc.) in the access data 36. In this embodiment, this process may be performed by the content access handler 39, but may be performed via any other suitable method.

In some embodiments, the syndication ID may correspond to a given publication venue (e.g., web site) without regard to the content ID. For example, a host server 15*a* may assign a unique syndication ID to each publication venue, which is included in the embedded code for all of the content items syndicated by that publication venue. In brief, the syndication ID may then identify a syndication web site and, in some embodiments, may be a domain name associated with that web site.

The syndication data 38 of database 30 may include data for each publication venue for each item of syndicated content. For example, syndication data 38 may store records of syndication data for all of the syndicated content in the database 30. Each syndication record may include a syndication ID and content ID. Syndicated records also may include other data such as, for example, a time and date stamp identifying when the syndication was created, a URL address or other identification of the publication venue, and/or a parent venue ID (e.g., the syndication ID of the site from which the publication venue requested the embedded code). As discussed in more detail below, syndication data (alone or in conjunction with other data) may be used to generate various reports, provide incentives to syndicating web sites, determine compensation for syndicating web sites, determine advertising strategies, determine whether to permit syndication by one or more web sites, and/or for other purposes. Table 1 illustrates an example of data of syndication data 38 for content having content ID 123. The parent syndicator ID allows the operator to know from which syndicator a syndicating website received the embedded code for that video to thereby track the syndication of that content.

TABLE I

| Content ID | Syndication ID | Syndicator site | Parent Syndicator ID |
|---|---|---|---|
| 123 | 101 | www.abc.com | None |
| 123 | 102 | www.def.com | 101 |
| 123 | 103 | www.ghi.com | 102 |
| 123 | 104 | www.jkl.com | 101 |

Referring again to FIG. 1, consider a scenario in which a user 11*b* finds syndicated content at one of the existing publication venues for such content (e.g., published by server 12*a*). The existing syndicating venue from which other sites may request embedded code is referred to herein as a referral site, referral venue, or referring venue. In this example, the referral site has a web page (e.g., the web page that publishes the syndicated content) that includes a link for allowing others to request embedded code to become publication venues for the syndicated content. Thus, a publication venue serving as a referral site may sometimes include two links—one link to trigger presentation of the content and another link to request code for syndication of the content. Clicking on the link to request the code causes a page 40 (e.g., an HTML source file 42) to be presented which includes code 44 (see FIG. 2) that is to be embedded in a web page of the new publication venue's web site. The code 44 may include a content ID, a syndication ID, and an address for transmitting communications (e.g., the request) to the host server 15. The code 44 will cause two links to be displayed on the web page in which it is embedded. A first link requests the syndicated content. A second link allows users to request code in order to syndicate the content, which will include the content ID, syndication ID, and an address for transmitting requests for embedded code. In other embodiments, the link to request the embedded code is transmitted to the client when the client requests the syndicated content.

Figure 3:
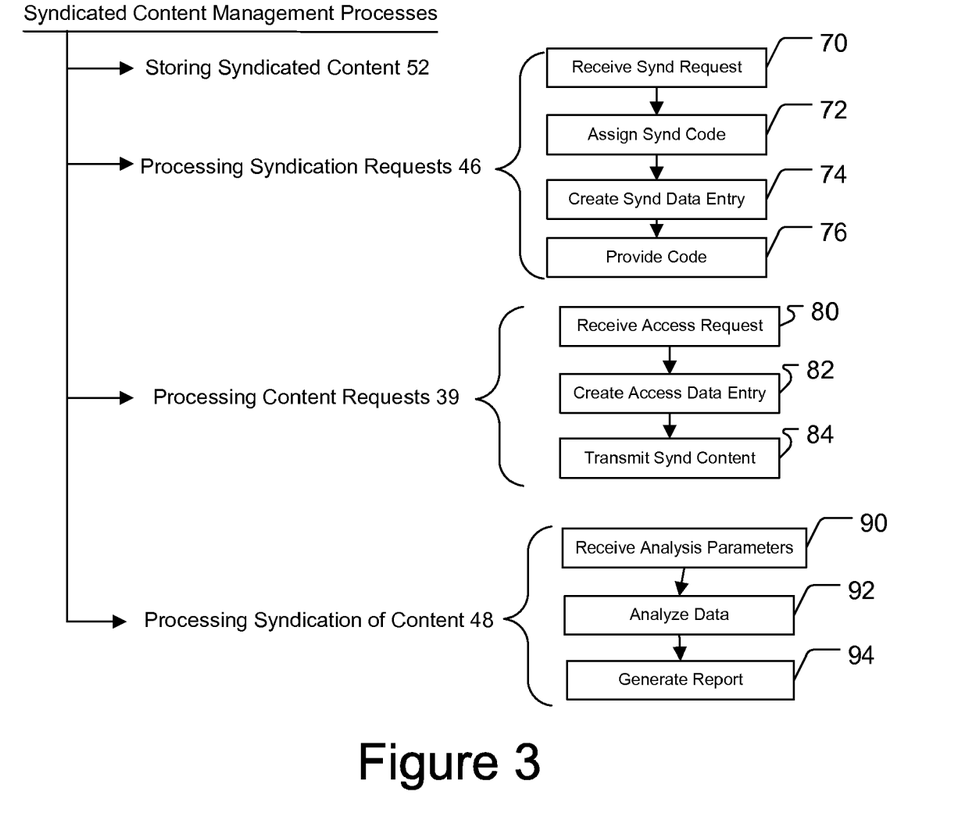
FIG. 3 is a process diagram of various syndicated content management processes according to an example embodiment of the present invention.

FIG. 3 illustrates processes for managing the syndication of content according to one example embodiment of the present invention. In this example implementation, host server 15 executes software code to perform many of the processes illustrated. Example processes include storing syndicated content 52, processing syndication requests 46, processing content requests 39 and processing the syndication of content 48. The process of storing the syndicated content 52 may include storing the content to be syndicated in memory accessible by the server 15 and assigning each content item a content ID. Typically, this process is performed when the content is uploaded to the server 15. As discussed, the content may be stored by the operator or as a result of uploading of content from members of the general public.

The processing of syndication requests 46 includes responding to requests to syndicate content. As described above, a user may actuate a link to request code to syndicate content. In this example embodiment, at process 70, a syndication request is received at the host server 15. The request may include the content ID for the syndicated content which the user desires to publish. In addition, the request also may include the syndication ID of the referral site (if any) from which the user (i.e., the user's client web browser) received the web page and initiated the syndication request. In addition, the server 15 may transmit a request for additional information such as a request for the web site (e.g., domain name) for the prospective publication venue. Process 46 may also include processes (not shown) for determining whether to grant the request and whether to provide this user with embedded code to thereby permit the user to syndicate the content. If the request is granted, process 72 may assign a syndication ID to this user (who is about to become a new syndicator). Process 74 then generates a new syndication record. Finally, process 76 generates the embedded source code 44 and transmits the code 44 to the client of the requesting user.

Table 1 above shows example syndication records including records corresponding to content having content ID=123). In this example, each entry includes the content ID, the syndication ID, the syndication web site, and the parent syndication ID, (i.e., referring web site's syndication ID).

When a user browses a web site that serves as a publication venue for a syndicated content item, the user may click on a content link to view or play the syndicated content. Alternatively, the video may begin playing (automatically) when the web page is loaded into the user's browser. In either instance, a request is transmitted to the host server 15 to provide the content item. The server 15 then processes the received content requests via process 39. In one example, process 80 receives the content request and process 82 generates an access data entry, which may include the content ID, syndication ID, and the time and date associated with the content request. Process 84 transmits the requested content item to the client of the user device from which the content request was generated. The syndicated content is then presented to the user via their web browser or other application.

An operator of the system may desire to obtain information about the syndicated content. In some embodiments the operator may execute software for processing data of the syndicated content. Such process may be executed by the host server 15 or may be executed at a remote device such as a personal computer or data may be transmitted to a third party data analysis service. For example, the operator may comply with security procedures (e.g., log in) to access the syndication data 38 and access data 36 remotely. The operator may provide certain parameters which are used to generate a report as is well-known in the art. At process 90 the analysis parameters are identified. At process 92, the data may be processed based upon those parameters. At process 94 a report is provided.

Following are examples of reports that may be generated:
Number of publication sites referred by each referring site;
Syndication depth for one or more content items;
Ranking of referral sites for number of new publication venues for a given content item, group of content items, or all content items;
Number of content views for which a syndicating web site is responsible (i.e., the number of content views of a syndicating web site and of all the third party web sites that have become syndicated directly or indirectly via that syndicating web site).
Analysis of a publication venue for content views and/or syndication referrals.

Figure 4:
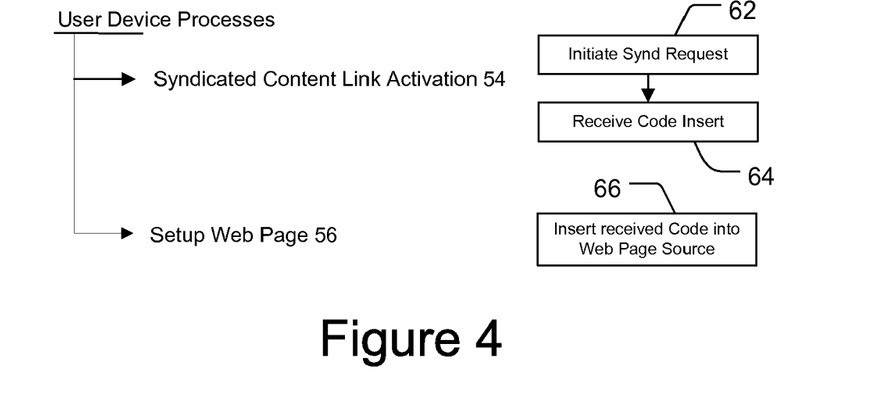
FIG. 4 is a process diagram of various client processes for becoming a publication venue for syndicated content according to an example embodiment of the present invention.

FIG. 4 illustrates processes that may be performed at a user device 16 by a client. To become a publication venue for syndicated content, a prospective syndicator may initiate a syndicated content link activation process 54. Consider the scenario in which the prospective syndicator views a referral site. In some embodiments, any and all of the publication venues for the syndicated content may be a referral site. At process 62, the user initiates a syndication request from a web page of a referral site (or the host site), such as by clicking on a link in the web page. Such request may be processed by the syndication request process 46 (see FIG. 3). At process 64, embedded code 44 is transmitted to the client of the user device. The user then performs a process to setup a web page 40. For example, an HTML editor or other conventional web page creation program may be used to insert the received embedded code 44 into the web page source file 42. The user then loads their web page source file 42 to their web server 12 making their web page 40 accessible via the internet 20. Such web page is now a publication venue for the syndicated content and the web site is also a referral site.

Figure 5:
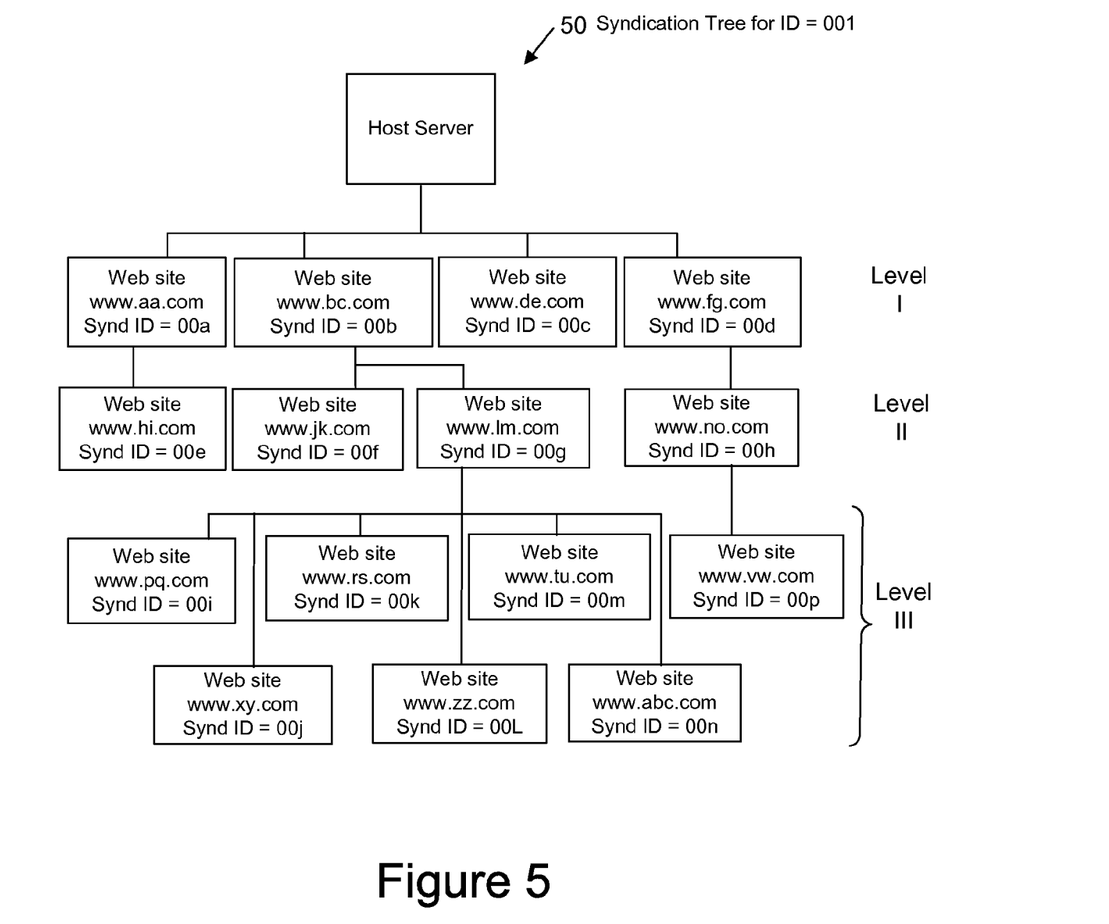
FIG. 5 is an example report generated by an example process of the present invention.

FIG. 5 shows an example report that comprises a syndication tree 50 for a syndicated content item (e.g., content ID=001), which may, for example, be a report generated by process 48. As will be evident to those skilled in the art, this is simply an example of a report and other formats may be used to illustrate the same information. In addition, other reports illustrating other information are also within the scope of the invention. In the illustrated example, four publication venues (web sites) received the embedded code from the host server 15. These four venues correspond to Level I in the report, and were assigned syndication IDs 00*a*, 00*b*, 00*c*, and 00*d*, respectively. In the illustrated example, Level II also includes four venues. In this example Level II refers to websites that received the embedded code from another website (a Level I website) that received the code 44 from the host server. One publication venue (i.e., syndication ID=00*e*) was referred by the website having syndication ID 00*a*. Two other websites (i.e., having syndication IDs 00*f*, 00*g*) were referred by the venue having syndication ID 00*b*. The fourth web site (i.e., syndication ID=00*h*) of Level II was referred by the venue having syndication ID 00*d*. Level III includes seven publication venues. Six of those publication venues (i.e., syndication IDS 00*i*, 00*j*, 00*k*, 00L, 00*m*, and 00*n*) were referred by the venue having syndication ID 00*g*. The seventh publication venue (i.e., syndication ID 00*p*) of Level III was referred by the venue having syndication ID 00*h*. Thus, this report provides a graphical representation of the syndication of a content item over the Internet. The website of this example referring the most publication venues is the site having a syndication ID=00*g*, which referred six new publication venues. The number of entries in the database, and the look and depth of the tree 50 may change as new publication venues syndicate the content.

In a given embodiment, processing of syndication of content 48 may include analyzing the syndication data and/or access data entries for one or more syndicated content items and providing information, such as that available in a syndication tree. In some embodiments the process 48 also may provide other information, such as by analyzing the access data 36 to identify the most popular content 30. Various viewing patterns, viewing histories, syndication patterns and syndication histories may be determined by analyzing either one or both of the access data 36 and syndication data 38.

In the above example each referral site is also a publication venue. However, in other embodiments a referral site may comprise an email (or other website or internet form). In addition, while the above description is in the context of syndicating the publishing of video content, the present invention is equally suitable for syndicating other types of content such as audio content, HTML, etc. In addition, the published video content may be presented to the end user in a video player that may be substantially surrounded by a video skin that may, itself, display one or more advertisements. An example of a video skin used to syndicate video content is disclosed in U.S. patent application Ser. No. 11/750,665, filed May 18, 2007, published as U.S. Patent Appl. Publication No. 2008/0288973, and entitled "System and Method for Providing Advertisements for Video Content in a Packet Based Network," which is hereby incorporated by reference in its entirety.

The content ID and syndication ID can take many forms provided that the appropriate information is provided to the host server. For example, the content ID and syndication ID may each form part of the same data string (e.g., the first 10 digits being the content ID and the second 10 digits being the syndication ID). Similarly, the syndication ID and/or the content ID may comprise multiple variables (data strings)—or parts thereof—of the embedded code. In one example, a website's domain may form all or part of the syndication ID.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method comprising:
receiving, at a host server from a web server, a request for a syndication code for content stored at the host server;
determining, at the host server, a content identifier from the request;
determining, at the host server, a parent syndication identifier from the request, wherein the parent syndication identifier is associated with a second web server at which the web server generated the request;
generating, at the host server, a unique syndication identifier that represents a combination of an identifier of the content and an identifier of the web server;
generating, at the host server, the syndication code comprising the unique syndication identifier, a link to the content, and a syndication request link that, when activated, generates a second request for a second syndication code for the content, the second request comprising the unique syndication identifier;
transmitting the syndication code from the host server to the web server; and
storing, in a content database at the host server, the unique syndication identifier and the content identifier, wherein the unique syndication identifier is associated with the content identifier in the content database.

2. The method of claim 1, further comprising receiving, at the host server, the second request for the second syndication code for the content from a third web server and, in response, generating the second syndication code.

3. The method of claim 1, further comprising storing, in the content database at the host server, the parent syndication identifier, wherein the parent syndication identifier is associated with the unique syndication identifier and the content identifier in the content database.

4. The method of claim 1, further comprising determining, at the host server, a number of syndication identifiers associated with the parent syndication identifier.

5. The method of claim 4, further comprising determining, at the host server, a ranking of the parent syndication identifier among a plurality of parent syndication identifiers based on the number of syndication identifiers associated with the parent syndication identifier.

6. The method of claim 1, further comprising determining, at the host server, a web server address from the request.

7. The method of claim 6, further comprising storing, in the content database at the host server, the web server address, wherein the web server address is associated with the unique syndication identifier and the content identifier in the content database.

8. The method of claim 1, wherein the link to the content, when activated, automatically presents the content.

9. The method of claim 1, further comprising determining, at the host server, a number of transmissions of the content resulting from requests for the content generated by activating the syndication code at the web server.

10. A host server comprising:
a memory comprising a content database and content; and
a processor in communication with the memory, the processor configured to:
receive a request by a web server for a syndication code for the content;
determine a content identifier from the request;
determine a parent syndication identifier from the request, wherein the parent syndication identifier is associated with a second web server at which the web server generated the request;
generate a unique syndication identifier that represents a combination of an identifier of the content and an identifier of the web server;
generate the syndication code comprising the unique syndication identifier, a link to the content, and a syndication request link that, when activated, generates a second request for a second syndication code for the content, the second request comprising the unique syndication identifier;
transmit the syndication code to the web server; and
store, in the content database, the unique syndication identifier and the content identifier, wherein the unique syndication identifier is associated with the content identifier in the content database.

11. The host server of claim 10, wherein the processor is further configured to receive the second request for the second syndication code for the content from a third web server and, in response, generate the second syndication code.

12. The host server of claim 11, wherein the processor is further configured to store, in the content database, the unique syndication identifier, the content identifier, and a second unique syndication identifier generated by the processor that represents combination of the identifier of the content and an identifier of the third web server, wherein the second unique syndication identifier is associated with the unique syndication identifier and the content identifier in the content database.

13. The host server of claim 12, wherein the processor is further configured to determine a number of transmissions of the content resulting from requests for the content generated by activating the second syndication code at the third web server.

14. The host server of claim 10, wherein the processor is further configured to determine a number of transmissions of the content resulting from requests for the content generated by activating the syndication code at the web server.

15. The host server of claim 10, wherein the processor is further configured to determine a number of syndication identifiers associated with the unique syndication identifier in the content database.

16. The host server of claim 10, wherein the processor is further configured to receive a request by a user device to present the content at the user device, and, responsive to receiving the request to present the content, transmit the content to the user device.

17. The host server of claim 10, wherein the processor is further configured to store, in the content database, an indication of each transmission of the content from the host server.

18. The host server of claim 10, wherein the content is at least one of video content, image content, audio content, text content, graphical content, or animated content.

19. A non-transitory computer-readable medium, the computer-readable medium having instructions stored thereon, the instructions comprising:
    instructions for receiving a request for a syndication code for content from a web server;
    instructions for determining a content identifier from the request;
    instructions for determining a parent syndication identifier from the request, wherein the parent syndication identifier is associated with a second web server at which the web server generated the request;
    instructions for generating a unique syndication identifier that represents a combination of an identifier of the content and an identifier of the web server;
    instructions for generating the syndication code comprising the unique syndication identifier, a link to the content, and a syndication request link that, when activated, generates a second request for a second syndication code for the content, the second request comprising the unique syndication identifier;
    instructions for transmitting the syndication code to the web server;
    instructions for storing, in a content database, the unique syndication identifier and the content identifier; and
    instructions for associating the unique syndication identifier with the content identifier in the content database.

20. The non-transitory computer-readable medium of claim 19, wherein the instructions further comprise instructions for receiving, from a user device, a request to present the content at the user device, and, responsive to receiving the request to present the content, transmitting the content to the user device.

21. The non-transitory computer-readable medium of claim 20, wherein the instructions further comprise instructions for storing, in the content database, at least one of a time at which the request to present the content was received, a date on which the request to present the content was received, an address of the user device, or a second syndication identifier associated with a third web server at which the second syndication code is configured that, upon activation, generated the request to present the content.

22. The non-transitory computer-readable medium of claim 19, wherein the unique syndication identifier comprises a domain name associated with the web server.

23. The non-transitory computer-readable medium of claim 19, wherein the instructions further comprise instructions for storing, in the content database, at least one of a time at which the syndication code was generated, a date on which the syndication code was generated, or an address of the web server.

24. The non-transitory computer-readable medium of claim 19, wherein the instructions further comprise instructions for determining syndication identifiers associated with the unique syndication identifier.

25. The non-transitory computer-readable medium of claim 19, wherein the instructions further comprise instructions for transmitting, to the web server, a request for additional information.

26. The non-transitory computer-readable medium of claim 19, wherein the instructions further comprise instructions for determining that the request for a syndication code for the content is to be granted.

27. The non-transitory computer-readable medium of claim 19, wherein the instructions further comprise instructions for generating a syndication tree indicating a relationship between each of a plurality of web servers to which syndication codes have been transmitted.

* * * * *